Patented Nov. 14, 1922.

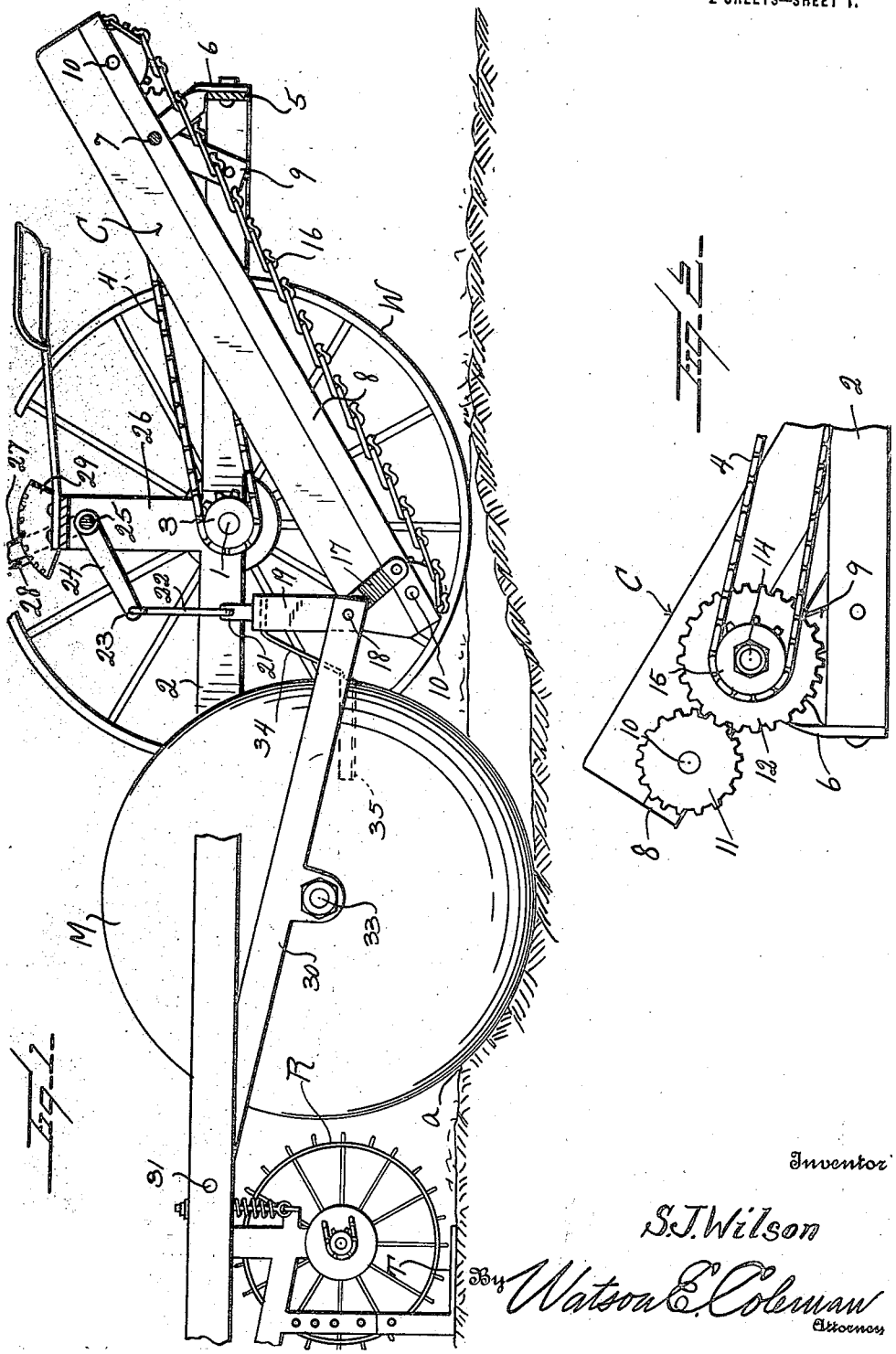

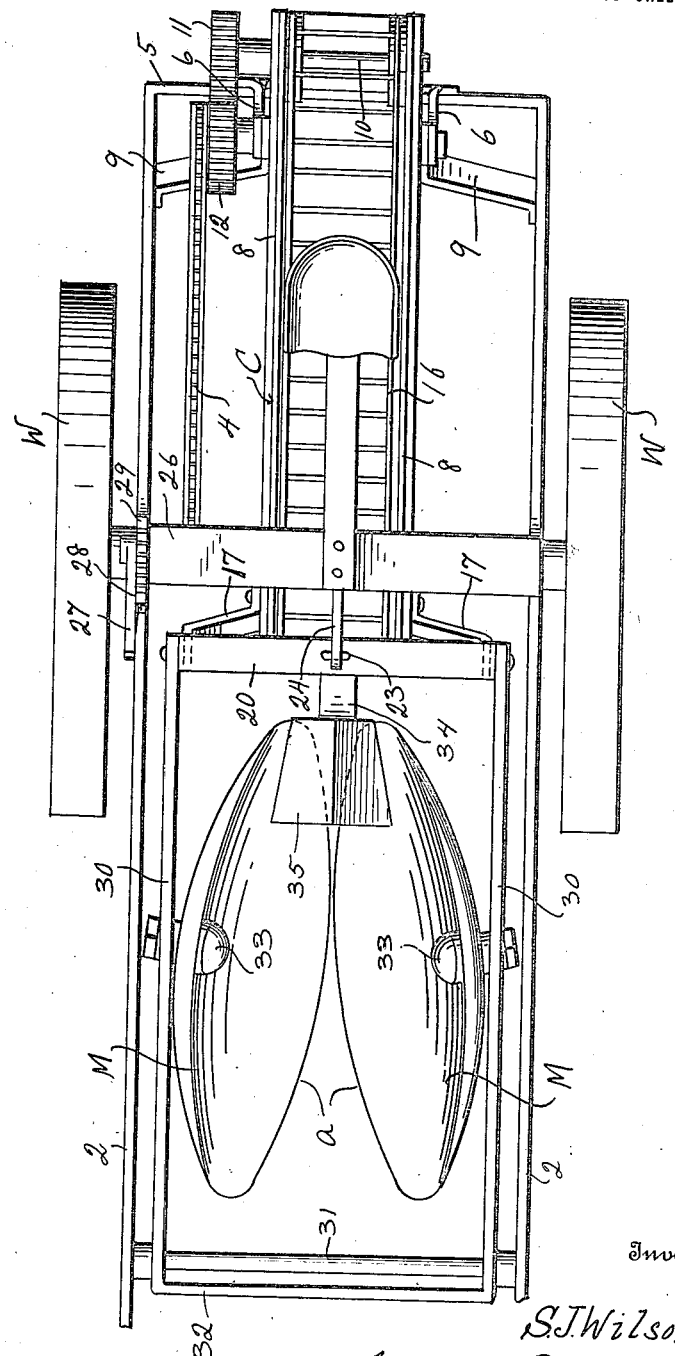

1,435,569

UNITED STATES PATENT OFFICE.

SAMUEL J. WILSON, OF ROBERTS, IDAHO.

HARVESTING MACHINE.

Application filed December 22, 1920. Serial No. 432,501.

*To all whom it may concern:*

Be it known that I, SAMUEL J. WILSON, a citizen of the United States, residing at Roberts, in the county of Jefferson and State of Idaho, have invented certain new and useful Improvements in Harvesting Machines, of which the following is a specification, reference being had to the accompanying drawings.

This invention relates to certain improvements in harvesting machines and has relation more particularly to a device of this general character especially designed and adapted for use in the harvesting of beets, potatoes, or the like, and it is an object of the invention to provide a machine of this general character having novel and improved means whereby the tuber or root may be elevated or lifted through the instrumentality of two rotating ground working members arranged to penetrate the soil at opposite sides of and in close proximity to the tubers or roots.

Another object of the invention is to provide a novel and improved device of this general character which is easy of draft and which embodies rotating ground working members operating to cut a wedge-shaped furrow containing the tuber or root crop and elevating the same by rotary motion sufficiently high to deposit such tuber or root crop onto a suitable conveyor.

An additional object of the invention is to provide a novel and improved device of this general character wherein the ground working members or lifting elements may be adjusted in a vertical direction in order to comply with the requirements of practice.

The invention consists in the details of construction and in the combination and arrangement of the several parts of my improved harvesting machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view partly in side elevation and partly in section illustrating a harvester constructed in accordance with an embodiment of my invention.

Figure 2 is a fragmentary view in side elevation illustrating a portion of the means for operating the conveyor mechanism, and Figure 3 is a fragmentary view in top plan of the structure as illustrated in Figure 1.

As disclosed in the accompanying drawings, F denotes an elongated frame of requisite dimensions, the supporting means for which frame includes the rear ground engaging wheels W. One of the wheels W is fixed to a stub shaft 1 rotatably supported by the adjacent side member 2 of the frame F and extending inwardly of said side member. Fixed to the inner end portion of the stub shaft 1 is a sprocket wheel 3 around which passes an endless chain 4.

The rear cross member 5 of the frame F is provided with the upstanding arms 6 with the upper end portions of which are pivotally engaged, as at 7, the rear or upper end portions of the side members 8 of a conveyor mechanism C. 9 denotes a bracing member interposed between a side member 2 of the frame F and the pivot member 7 between an arm 6 and a side member 8 of the conveyor mechanism C.

Rotatably supported between the opposite end portions of the side members 8 of the conveyor mechanism C are the shafts 10. The rear or upper shaft 10 extends beyond one side of the mechanism and to said extended portion is suitably fixed a gear 11 meshing with an idle gear 12 rotatably supported by a journal post 14 afforded by extending one of the pivot members 7. Carried by the second gear 12 and rotatable therewith is a sprocket 15 with which engages the endless chain 4 so that the upper shaft 10 is in driven connection with the sprocket 3. Operatively engaged with the shafts 10 between the side members 8 is an endless conveyor or elevator 16.

Pivotally engaged with the forward or lower end portion of each of the side members 8 of the conveyor mechanism C is the lower extremity of an upstanding link 17 having its upper or opposite end portion pivotally engaged, as at 18, with the free end portion of the side arm 19 of a yoke 20, said yoke being substantially in the form of an inverted U. Secured to the central portion of the yoke 20 is an upstanding clevis 21 with which is operatively engaged an end portion of a rod 22. The opposite end portion of the rod 22 is operatively engaged, as at 23, with a forwardly directed rock arm 24 carried by the shaft 25. The shaft 25 is disposed transversely of the frame F and rotatably supported by the upper portion of the transversely disposed supplemental frame 26 substantially in the form of an inverted U. One end portion of the shaft 25 is provided with an operating lever 27 provided with a conventional latch mechanism 28 coacting with a rack 29.

The pivot members 18 also have pivotally engaged therewith the free or rear end portions of the elongated arms 30 extending longitudinally of the frame F and having their upper or forward end portions pivotally engaged, as at 31, with the side members 2 of the frame F. The upper or pivoted end portions of said arms 30 are connected by a cross member 32.

The arms 30 intermediate their ends are provided with the inwardly directed stub axles 33 upon which are rotatably mounted the concavo-convex lifting or ground working members M. The stub axles 33 are disposed on an upward and forward incline so that the lower peripheral portions of the members M are brought into relatively close proximity one to the other while the forward peripheral portions of said members M separate to a greater extent than the rear peripheral portions of said members.

In practice, it is preferred that each of the members M be about forty inches in diameter and penetrating the ground or soil about seven or eight inches. The relative inclinations of the members M are such that the forward portions *a* of said members M at substantially the ground level are about eight inches apart in order to assure the proper entrance of a furrow while the corresponding rear portions of the members are spaced substantially one and one-half inches to allow sufficient room for the long tail of a beet or the like so that such tail will not be cut or broken as the beet is lifted together with the soil, by the upward rotary movement of the members M.

When the lower end portion of the conveyor mechanism C is raised or lowered, the members M will be correspondingly adjusted as the rear or lower end portions of the arm 30 will move or swing upwardly or downwardly with the conveyor mechanism.

To the yoke 20 I preferably secure a spring tongue 34 which extends intermediate the rear portions of the members M and forms a mounting for the plate 35. The edges of this plate engage against the inner faces of the members M and scrape therefrom any inherent soil. This plate performs a further function of yieldably forcing the discharge of the furrow and of smashing any lump in lumpy soil which greatly facilitates the screening of the soil by the conveyor chain.

Positioned forwardly of the members M and operatively supported by the frame F is a topping mechanism T and a rotary lifting member R preferably of a type disclosed in my Patent No. 1,369,721, granted February 22, 1921.

From the foregoing it is thought to be obvious that a harvesting machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In a harvesting machine including a frame, transversely spaced arms pivotally supported by the frame for swinging movement in a vertical direction, a rotary lifting element carried by each of the arms, said lifting elements being substantially transversely alined, the axis of rotation of each of said elements being upwardly and forwardly inclined, and means coacting with the frame for raising the elements.

2. In a harvesting machine including a frame, transversely spaced arms pivotally supported by the frame for swinging movement in a vertical direction, a rotary lifting element carried by each of the arms, said lifting elements being substantially transversely alined, the axis of rotation of each of said elements being upwardly and forwardly inclined, means coacting with the frame for raising the elements, and a conveyor supported by the frame rearwardly of the lifting elements and supported for swinging movement in a vertical direction, the lower end portions of the conveyor being operatively engaged with the arms so that the conveyor moves in a vertical direction in unison with the arms.

3. In a harvester of the class described, a lifting device operating two rotatable ground working members arranged side by side, the axis of rotation of each of said members being upwardly inclined, said ground working members having their opposed faces concave and a plate yieldably mounted intermediate the rear portions of said ground working members for the purpose described.

4. In a harvester, a lifting device operating two rotatable ground working members arranged side by side, and a plate yieldably mounted intermediate the rear portions of said ground working members.

In testimony whereof I hereunto affix my signature.

SAMUEL J. WILSON.